United States Patent
DuVal et al.

(10) Patent No.: US 8,502,115 B2
(45) Date of Patent: Aug. 6, 2013

(54) ENGINE DRIVEN WELDER-GENERATOR WITH CHOPPER CIRCUIT

(75) Inventors: Randall Joseph DuVal, Appleton, WI (US); Daniel C. Fosbinder, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 567 days.

(21) Appl. No.: 12/756,038

(22) Filed: Apr. 7, 2010

(65) Prior Publication Data
US 2010/0314372 A1   Dec. 16, 2010

Related U.S. Application Data

(60) Provisional application No. 61/186,169, filed on Jun. 11, 2009.

(51) Int. Cl.
*B23K 9/10* (2006.01)
*H05B 7/11* (2006.01)

(52) U.S. Cl.
USPC ................................. 219/133; 219/137 PS

(58) Field of Classification Search
USPC ......... 219/130.1–133, 136–137 WM, 137 PS
See application file for complete search history.

(56) References Cited

U.S. PATENT DOCUMENTS

| | | | |
|---|---|---|---|
| 6,531,685 B2 | 3/2003 | Smith | |
| 2002/0190044 A1 | 12/2002 | Leisner | |
| 2006/0175313 A1* | 8/2006 | Kooken et al. | 219/130.1 |
| 2008/0083705 A1* | 4/2008 | Peters | 219/61 |
| 2008/0116186 A1* | 5/2008 | Luck et al. | 219/132 |
| 2008/0308541 A1 | 12/2008 | Hiroi | |

FOREIGN PATENT DOCUMENTS

| | | | |
|---|---|---|---|
| JP | 2009000724 A | * | 1/2009 |
| WO | 2008045584 A1 | | 4/2008 |
| WO | 2008060753 A1 | | 5/2008 |

OTHER PUBLICATIONS

Miller Trailblazer Series, Spec Sheet, Apr. 2010, Index No. ED/4.77, pp. 1-8.*
"Miller 302 Trailblazer," YouTube, Uploaded by 7863348 on May 11, 2008, Retrieved from the Internet <http://www.youtube.com/watch?v=9WYtEvIM-RY>.*
International Search Report for application No. PCT/EP2010/035964 mailed Sep. 2, 2010.

\* cited by examiner

*Primary Examiner* — Alexander Sofocleous
*Assistant Examiner* — Lance Reidlinger
(74) *Attorney, Agent, or Firm* — Fletcher Yoder P.C.

(57) ABSTRACT

An engine driven welder-generator including a chopper circuit and being adapted to produce an AC weld output, a DC weld output, and an auxiliary output is provided. The engine driven welder-generator is capable of selectively running at a low engine speed or a high engine speed based on operator inputs and may produce both AC and DC power outputs while utilizing the chopper circuit. The engine driven welder-generator is also adapted to provide an auxiliary output during an AC welding process and a DC welding process.

20 Claims, 3 Drawing Sheets

ENGINE DRIVEN WELDER-GENERATOR WITH CHOPPER CIRCUIT

CROSS REFERENCE TO RELATED APPLICATIONS

This application is a Non-Provisional patent application of U.S. Provisional Patent Application No. 61/186,169, entitled "Engine Driven Welder (Chopper) with AC Weld", filed Jun. 11, 2009, which is herein incorporated by reference.

BACKGROUND

The invention relates generally to welding systems, and, more particularly, to an engine driven welder-generator.

Welding is a process that has become increasingly ubiquitous in various industries and applications. While such processes may be automated in certain contexts, a large number of applications continue to exist for manual welding operations, which often rely on the use of a welder-generator to power the welding process. Welder-generators typically include internal components, such as electrical circuitry, a generator, an engine, and a muffler, which cooperate to produce a suitable power output for the welding operation. Such power outputs may be alternating current (AC) power or direct current (DC) power depending on the welding operation being performed. Moreover, the power may be adapted for particular applications, such as metal inert gas (MIG) welding, tungsten inert gas (TIG) welding, stick welding, and so forth.

Some welding operations may require an operator to switch between welding processes that require different power outputs (e.g., switch between AC TIG welding and DC stick welding). Furthermore, welding operators often require the use of AC auxiliary power for tools, such as hand grinders and lamps. Such auxiliary power may be provided by the welding power supply (e.g., an engine driven generator), but typically operating under a particular regime (e.g., at a constant speed needed to provide fixed frequency output (e.g., 60 Hz in North America), or via so-called "synthetic aux" equipment (e.g., inverter circuits). Accordingly, a welding operator may require the flexibility to alternate between an AC power output and a DC power output during the welding operation. The operator may also require both a DC power output and an AC power output concurrently during a weld, such as when the operator is running a DC welding process and using auxiliary power for one or more tools. Unfortunately, many traditional welder-generators require welding operators to choose between DC welding power and AC welding power. Accordingly, there exists a need for improved welder-generators that overcome such drawbacks.

BRIEF DESCRIPTION

In an embodiment, an engine driven welder-generator includes an engine and a generator driven by the engine to produce an alternating current (AC) power output. A first portion of the AC power output is provided as an AC weld power output. The engine driven welder-generator also includes a rectifier adapted to receive a second portion of the AC power output and to rectify the second portion of the AC power output to produce a rectified output. The engine driven welder-generator also includes a chopper circuit adapted to receive and chop the rectified output from the rectifier and to output a direct current (DC) weld power output.

In another embodiment, an engine driven welder-generator includes an engine and a generator driven by the engine to produce power. The engine driven welder-generator also includes power conversion circuitry including a chopper coupled to the generator and adapted to convert the power from the generator to an AC welding power output and a DC welding power output. The engine driven welder-generator also includes a controller adapted to detect the presence of an AC power load, to regulate the engine speed to an increased engine speed when the AC power load is detected, and to regulate the engine speed to a decreased engine speed when the AC power load is not detected.

In another embodiment, a welding system includes an engine driven generator including an engine and a generator and being adapted to produce an alternating current (AC) power output. The welding system also includes a chopper circuit adapted to process power from the generator to generate a direct current (DC) weld power output. The welding system also includes a control circuit adapted to regulate a speed of the engine to an increased engine speed when an AC weld output is desired, and to regulate the engine speed to a decreased engine speed when a DC weld output is desired.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of an engine driven welder-generator including a chopper circuit and being adapted to produce an AC weld output, a DC weld output, and an auxiliary output are provided. The welder-generator is capable of producing comparable arc quality at low engine speeds (e.g., 2400 rpm) and high engine speeds (e.g., 3600 rpm), selectively running at a low engine speed or a high engine speed based on operator inputs, and producing both AC and DC outputs while utilizing the chopper circuit. Such features may have the effect of increasing fuel efficiency and reducing sound levels while maintaining arc quality as compared to traditional systems. That is, since embodiments of the disclosed welder-generator can output both AC and DC outputs but the engine is adapted to run at a low speed unless an AC output is desired, auxiliary loads may be accommodated (i.e., engine runs at high speed when auxiliary power is needed) but power may be conserved (i.e., engine runs at a low speed) when the AC output is not needed. In this way, the welder-generator provides superior versatility (i.e., supports AC and DC processes) without operating at a single high speed in all instances. Due to the ability to produce AC and DC output, and by virtue of the chopper circuit, in many applications, the engine may be operated for extended periods at the reduced speed (e.g., 2400 rpm) and provide all required power, thereby reducing wear, extending life, reducing noise and emissions, as well as fuel consumption. Only when necessary is the speed increased.

It should be noted that the patent application entitled, "Integrated Engine-Driven Generator Control System" that was filed on Jan. 30, 2009 with Ser. No. 12/362,925 is hereby incorporated by reference. The incorporated application relates to control of an engine driving an electrical generator, and such control systems and methods may be employed with embodiments of the invention disclosed herein. Specifically, the incorporated application is directed toward an engine powering a generator/welder that may include controls which affect the engine speed, ignition, fuel injection, spark timing, and any other controllable parameter of the engine based on various inputs. Such inputs may include, for example, currents or voltages supplied to loads, such as a welding gun and/or an auxiliary device, preset welding parameters, and time.

Figure 1:
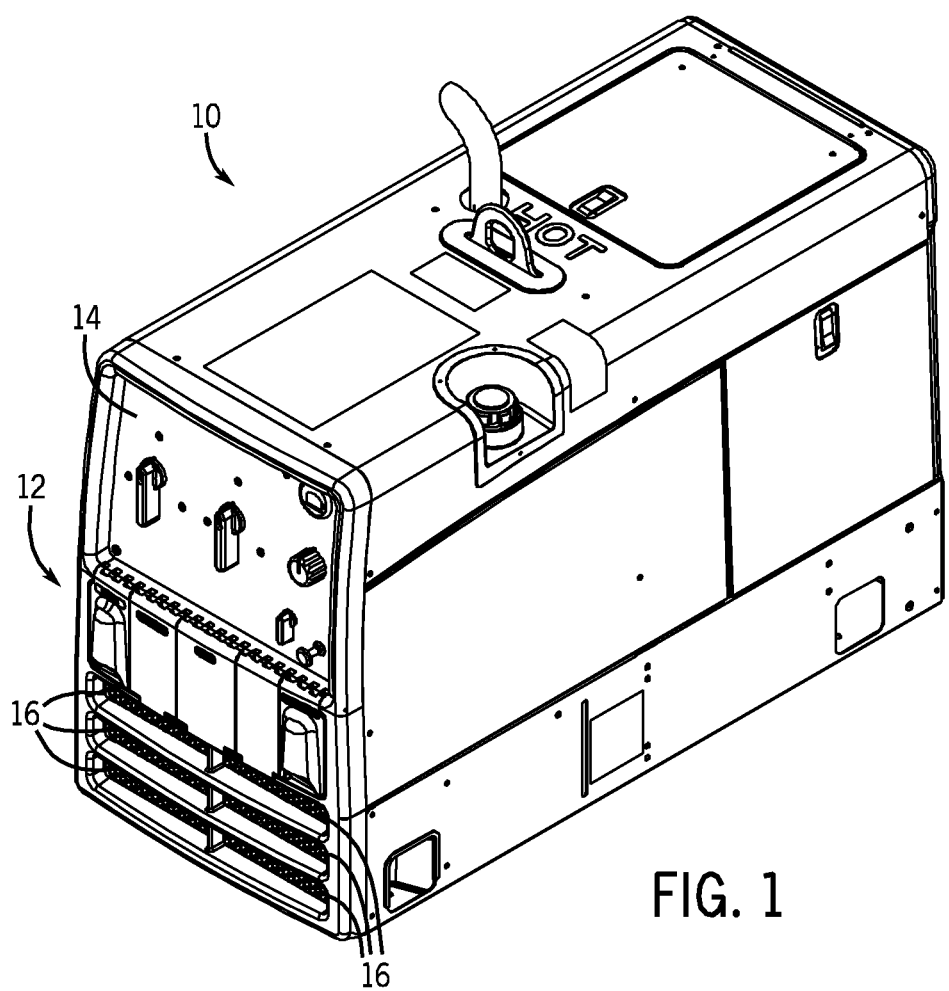
FIG. 1 is a perspective view of an exemplary engine driven welder-generator that includes a chopper circuit in accordance with aspects of the present invention.

Turning now to the drawings, FIG. 1 illustrates an exemplary engine driven welder-generator 10, which functions to power, control, and provide consumables to a stick welding operation. However, those skilled in the art would understand that the present disclosure also relates to similar operations that may be performed in which weldments are formed but the welding process differs. That is, embodiments may be applicable to welder-generators used for MIG welding processes, TIG welding processes, and so forth. Furthermore, embodiments of the present invention may be used in conjunction with a single or dual generator welder. Indeed, the system described herein is envisaged for use with all such operations where power is supplied to a location where welding is carried out.

In the illustrated embodiment, a front side 12 of the welder 10 includes a control panel 14, through which an operator may control the supply of materials, such as power, gas flow, and so forth, to a welding operation. The welder 10 may intake air through vents 16 to cool one or more internal components of the welder 10. The welder-generator 10 may be portable and may be communicatively coupled to additional system components, such as a wall power outlet, a battery, and so forth. Furthermore, the welder-generator 10 may include functional components, such as an engine, a single generator, a dual generator, fans, electrical circuitry, and so forth, suitable for the given welding application. Additionally, presently contemplated embodiments of the welder include a chopper circuit and are configured to generate both alternating current (AC) and direct current (DC) outputs.

Figure 2:
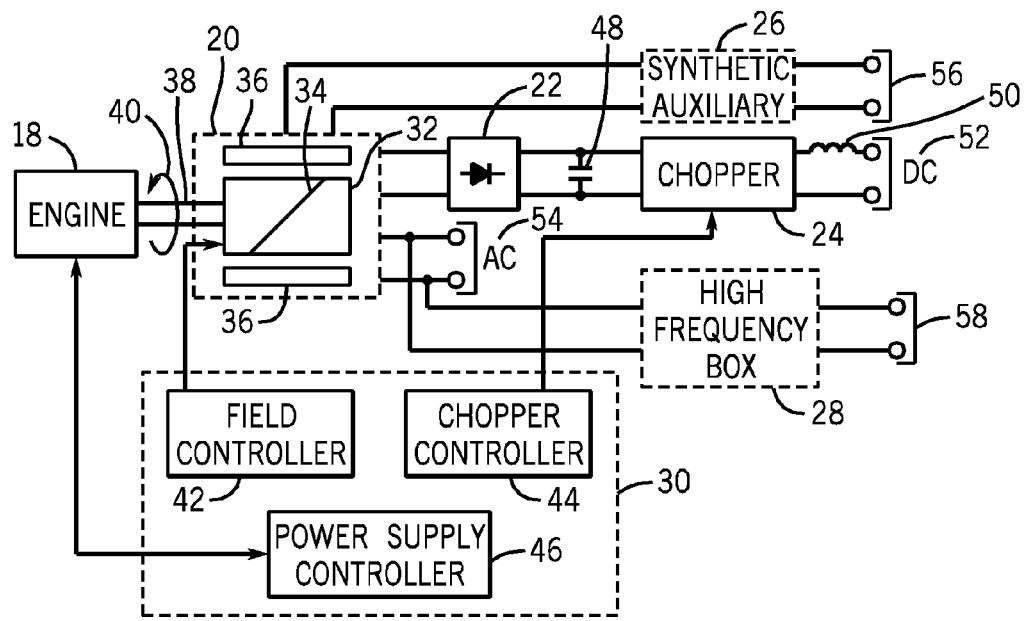
FIG. 2 is a block diagram illustrating exemplary functional components of a single generator welder in accordance with aspects of the present invention.

FIG. 2 is a block diagram illustrating exemplary functional components of an embodiment of a single generator welder. In the illustrated embodiment, the welder includes an engine 18, a generator 20, a rectifier 22, a chopper circuit 24, a synthetic auxiliary output 26, a high frequency box output 28, and a controller 30. The generator 20 includes a rotor 32 with field windings 34 and a stator 36. The generator 20 is coupled to the engine 18 via a shaft 38 that is configured to rotate, as indicated by arrow 40. The controller 30 includes a field controller 42, a chopper controller 44, and a power supply controller 46. The welder may also include electrical elements, such as one or more capacitors 48 and one or more inductors 50, which cooperate with the chopper 24 to generate a DC weld output 52, an AC weld output 54, a synthetic auxiliary output 56, and an auxiliary output 58.

During operation, the rotor 32 is driven in rotation within the stator 36 by the engine 18 and generates AC power output under the control of the field winding. That is, the shaft 38 rotates, as shown by arrow 40, to transmit power from the engine 18 to the generator 20. The shaft 38 also connects the engine 18 and the generator 20 for proper alignment while resisting bending and axial loads. The engine 18 and the generator 20 cooperate to generate power that may be provided as the AC power output 54. The AC power output may also supply the auxiliary power output 58 and the high frequency box 28. That is, in the same manner as in conventional systems, certain AC TIG welding operations may require use of the high frequency box 28 that requires the engine 18 to run at 3600 rpm.

The power generated by the engine 18 and the generator 20 also supplies the rectifier 22, which converts the AC output from the engine to a DC output suitable for a variety of welding applications. The DC output from the rectifier 22 is further processed by the chopper 24 and its associated electrical circuitry before being supplied to the DC output 52. For instance, the capacitor 48 smoothes the ripple of the rectifier output before it reaches the chopper 24. The chopper 24 receives and breaks up the DC signal, processes the signal as an AC signal, and outputs a reconstructed DC signal. The inductor 50 is then used by the chopper to smooth the reconstructed DC signal before providing the final DC output 52 for downstream welding applications. The synthetic auxiliary output 56 is provided from the AC stator windings 36.

The operation of the power supply circuitry is regulated and controlled by the controller 30. Specifically, the power supply controller 46 regulates and controls the operation of the engine 18 via a bidirectional exchange of information between the engine 18 and the controller 46. The power supply controller 46 may receive one or more inputs from an operator control panel and may regulate engine performance according to the operator inputs. For instance, a user may specify the type of welding process (e.g., AC stick welding, AC TIG welding, DC stick welding, DC MIG welding, etc.) as well as whether or not auxiliary power is desired, and the power supply controller 46 may determine an appropriate engine speed based on such inputs. For example, the operator may specify that the welding process is DC MIG and that no auxiliary power is desired (or that no auxiliary power draw is detected). In such a case, the power supply controller 46 would direct the engine 18 to run at 2400 rpm. That is, embodiments of the present invention allow for the engine to maintain an output sufficient for high arc quality when running at either 2400 rpm or 3600 rpm. Provided embodiments also allow for the engine to provide an AC output, a DC output, and an auxiliary output.

Still further, during operation, the field controller 42 is configured to control operation of the rotor 32. For example, in some embodiments, the stator 36 may function as an electromagnet, and the field controller 42 may control the process through which the field coil 34 energizes the stator 36. Additionally, the chopper controller 44 may control and regulate the functioning of the chopper 24 based on inputs received from the operator interface and feedback from other controllers. For example, the chopper controller 24 may direct the regulation of the DC output 52 by the chopper 24 to maintain an output suitable for the chosen welding process. Furthermore, in some embodiments, the controller 30 may include additional control circuits, such as an interface controller that is configured to receive inputs from the operator and to transmit those inputs to the appropriate controllers. Indeed, any number of controllers suitable for the given welding operation may be included in the controller 30.

Figure 3:
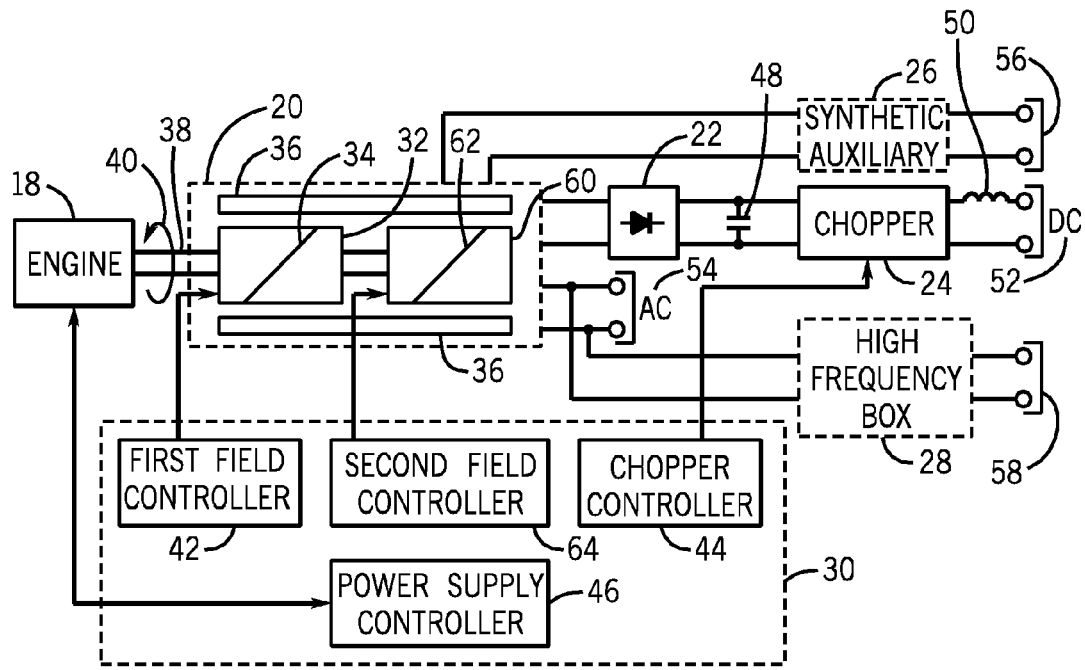
FIG. 3 is a block diagram illustrating exemplary functional components of a dual generator welder in accordance with aspects of the present invention.

FIG. 3 is a block diagram illustrating exemplary functional components of an embodiment of a dual generator welder. In the illustrated embodiment, as before, the welder includes the engine 18, the generator 20, the rectifier 22, the chopper circuit 24, the synthetic auxiliary output 26, the high frequency box output 28, and the controller 30. However, in the embodiment of FIG. 3, the generator 20 includes the rotor section 32 with field windings 34 as well as a second rotor section 60 with second field windings 62. That is, the illustrated embodiment features a dual generator 20. To support the dual generator design, the controller 30 includes the field controller 42, a second field controller 64, the chopper controller 44, and the power supply controller 46. As before, the capacitor 48 and the inductor 50 cooperate with the chopper 24 to generate the DC weld output 52, the AC weld output 54, and the auxiliary output 58. The synthetic auxiliary output 56 is provided from the AC stator windings 36.

During operation of the dual generator welder, the first field controller 42 controls operation of the first rotor section 32 with the first windings 34 and the second field controller 64 controls operation of the second rotor section 60 with the second windings 62. However, it should be noted that in further embodiments, a single field controller may be utilized to control the entire operation of the dual generator. Still further, although in the embodiments of FIGS. 2 and 3, the field controller and the chopper controller are illustrated as separate controllers, in other embodiments, the two controllers may be combined as one controller. Indeed, the power supply controller may also be combined with one or more of the other controllers.

Still further, it should be noted that a variety of inputs may be received by one or more of the control modules integral with the controller 30. For example, as discussed above, operator inputs from a control panel may be received by one or more of the control modules. Further, a variety of sensors configured to measure welding parameters may be located throughout the welding system. For instance, sensors may be appropriately positioned to measure field current, weld voltage feedback, weld current feedback, actual engine rpm, auxiliary voltage output, or a combination thereof.

Figure 4:
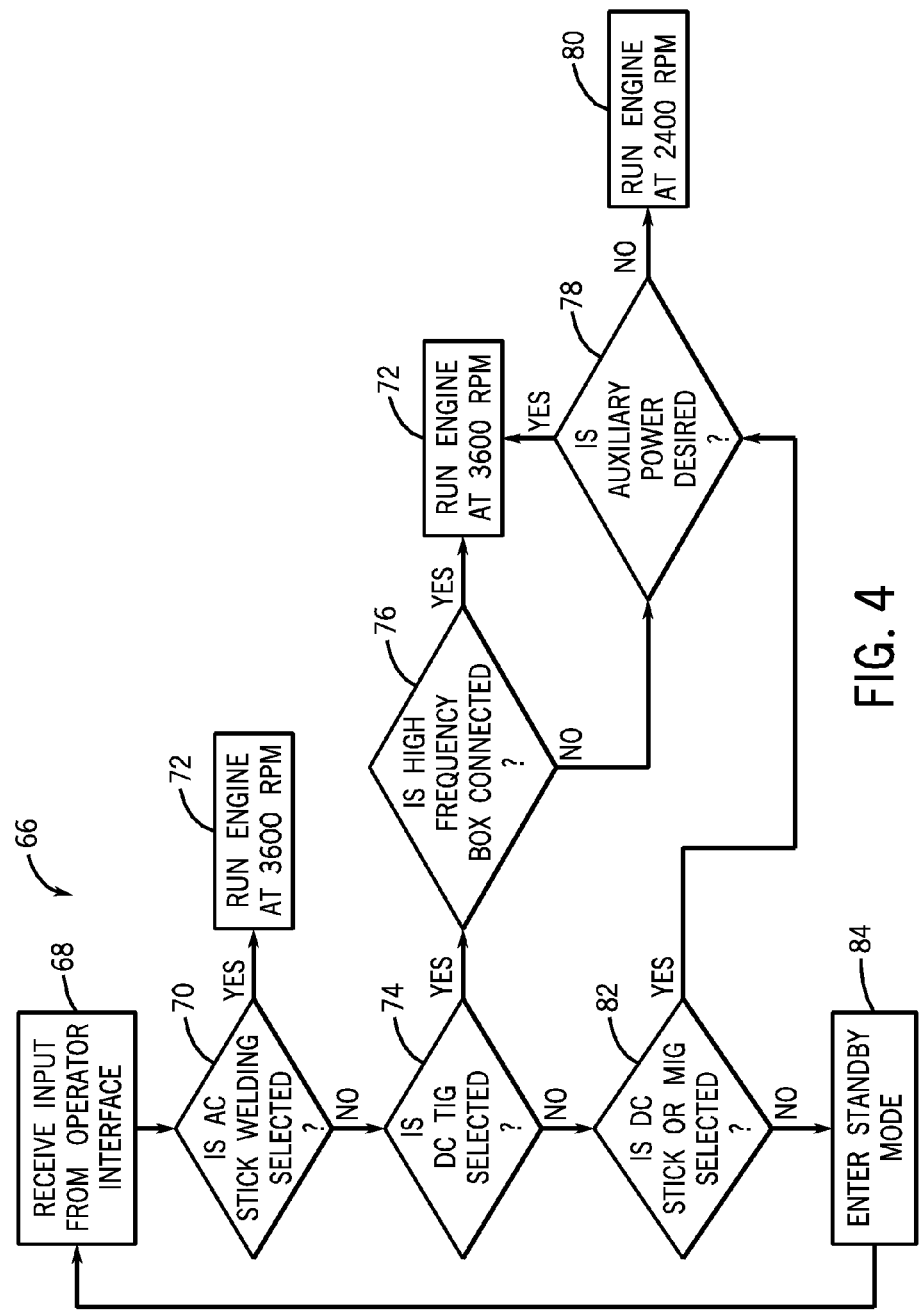
FIG. 4 is a flow chart illustrating exemplary control logic that may be employed by a controller of the welder-generator of FIG. 1 in accordance with aspects of the present invention.

FIG. 4 is a flow chart 66 illustrating exemplary control logic that may be employed by a controller of the welder-generator of FIG. 1. The flow chart 66 begins with an input received from an operator interface (block 68). Once the user selects the desired preferences via the interface, the controller checks whether AC stick welding has been selected (block 70). If AC stick welding has been selected, the controller outputs a control signal that directs the engine to run at 3600 rpm (block 72). If AC stick welding has not been selected, the controller checks whether DC TIG welding has been selected (block 74). If DC TIG welding has been selected, the controller checks whether a high frequency box requires a power output (block 76). If a high frequency box output is required, the controller directs the engine to run at 3600 rpm (block 72). If the high frequency box output is not required, the controller checks whether any other auxiliary power is desired (block 78). If auxiliary power is desired, the controller directs the engine to run at 3600 rpm (block 72). If auxiliary power is not desired, the controller directs the engine to run at 2400 rpm (block 80).

If DC TIG welding has not been selected, the controller checks whether DC stick welding or MIG welding has been selected (block 82). If either of these processes has been selected, the controller again checks if auxiliary power is desired (block 78). If auxiliary power is desired, the controller directs the engine to run at 3600 rpm (block 72). If auxiliary power is not desired, the controller directs the engine to run at 2400 rpm (block 80). Finally, if DC stick welding or DC MIG welding has not been selected by the operator, the controller enters standby mode (block 84) until receiving an input from the operator interface (block 68).

Those skilled in the art will appreciate that the foregoing logic may be implemented in many different ways, and code for a microprocessor or other processing device is well within the ambit of skilled artisans. For example, the various queries summarized above may be carried our in any desired order. Similarly the control algorithm summarized may be implemented as a state machine, or any other suitable programming structure.

It should be noted that the engine-generators disclosed herein that are capable of employing such a control scheme may offer distinct advantages over systems without chopper technology or systems with chopper technology that can only produce a DC output. That is, the engine-generator that includes chopper technology and is adapted to output AC power, DC power, and an auxiliary output may offer advantages over other systems when controlled in the manner described in FIG. 4. Specifically, such a system allows for greater control over the welding arc (i.e., react quickly to arc changes) as compared to systems without a chopper circuit. Additionally, since the systems disclosed herein produce substantially equivalent arc quality at both 2400 rpm and 3600 rpm, such systems may operate the engine at 2400 rpm in situations that do not require a 3600 rpm output (e.g., auxiliary loads, AC welding processes). This feature may allow for increased fuel efficiency, reduced sound levels, and so forth, while maintaining the same level of arc quality at high and low engine speeds. Additionally, such advantages are gained without having to sacrifice the ability to produce both an AC output and a DC output and to support an auxiliary load.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An engine driven welder-generator, comprising:
   an engine;
   a generator driven by the engine to produce an alternating current (AC) power output; wherein a first portion of the AC power output is provided as an AC weld power output;
   a rectifier configured to receive a second portion of the AC power output and to rectify the second portion of the AC power output to produce a rectified output;
   a chopper circuit configured to receive and to chop the rectified output from the rectifier and to output a direct current (DC) weld power output; and
   a controller configured to detect the presence of an AC power load and to regulate an engine speed based on the detected AC power load, wherein the controller comprises a power supply controller, a field controller, and a chopper controller.

2. The engine driven welder-generator of claim 1, wherein the chopper circuit is further configured to process the chopped rectified output as an AC signal.

3. The engine driven welder-generator of claim 1, wherein the generator is a dual generator that comprises two rotor sections.

4. The engine driven welder-generator of claim 1, wherein a portion of the AC weld power output is provided as an AC auxiliary power output.

5. The engine driven welder-generator of claim 1, wherein the engine is configured to run at approximately 2400 rpm when an AC power output is not desired and to run at approximately 3600 rpm when an AC power output is desired.

6. The engine driven welder-generator of claim 1, comprising a control circuit configured to detect the present of an auxiliary load demand and to regulate the engine to approximately 3600 rpm when the auxiliary load demand is detected.

7. The engine driven welder-generator of claim 1, comprising AC stator windings configured to provide a synthetic auxiliary output.

8. The engine driven welding-generator of claim 1, comprising a sensor configured to transmit a signal related to a field current, wherein the field controller is configured to control the generator based at least in part on the signal.

9. The engine driven welding-generator of claim 1, wherein the power supply controller is configured to regulate and control the engine, the field controller is configured to control a field coil to energize a stator of the generator, and the chopper controller is configured to control the chopper circuit based on inputs received from an operator interface and feedback from the control circuit.

10. An engine driven welder-generator, comprising:
an engine;
a generator driven by the engine to produce power, wherein the generator is a dual generator comprising a first rotor and a second rotor;
power conversion circuitry comprising a chopper coupled to the generator and configured to convert the power from the generator to an AC welding power output and a DC welding power output;
a controller configured to detect the presence of an AC power load, to regulate the engine speed to an increased engine speed when the AC power load is detected, and to regulate the engine speed to a decreased engine speed when the AC power load is not detected;
a first field controller configured to control the operation of the first rotor with a first winding; and
a second field controller configured to control the operation of the second rotor with a second winding.

11. The engine driven welder-generator of claim 10, wherein the AC power load is at least one of an AC stick welding selection, a high frequency box power draw, and an auxiliary power draw.

12. The engine driven welder-generator of claim 10, wherein the increased engine speed is approximately 3600 rpm.

13. The engine driven welder-generator of claim 10, wherein the decreased engine speed is approximately 2400 rpm.

14. The engine driven welding-generator of claim 10, wherein the controller comprises a field controller, a chopper controller, and a power supply controller.

15. A welding system, comprising:
an engine driven generator comprising an engine and a generator and being configured to produce an alternating current (AC) power output, wherein the generator is a dual generator comprising a first rotor and a second rotor;
a chopper circuit configured to process power from the generator to generate a direct current (DC) weld power output; and
a control circuit configured to regulate a speed of the engine to an increased engine speed when an AC weld output is desired, and to regulate the engine speed to a decreased engine speed when a DC weld output is desired, wherein the control circuit comprises a power supply controller configured to regulate and control the engine, a first field controller configured to control the operation of the first rotor with a first winding, a second field controller configured to control the operation of the second rotor with a second winding, and a chopper controller configured to control the chopper circuit based on inputs received from an operator interface and feedback from the control circuit.

16. The welding system of claim 15, wherein the AC weld output comprises an auxiliary power output.

17. The welding system of claim 15, wherein the increased engine speed is approximately 3600 rpm.

18. The welding system of claim 15, wherein the decreased engine speed is approximately 2400 rpm.

19. The welding system of claim 15, wherein the chopper circuit is further configured to receive a rectified DC signal, to chop the rectified DC signal, to process the chopped signal as an AC signal, and to output a reconstructed DC signal.

20. The welding system of claim 15, wherein the DC weld output comprises at least one of a DC stick welding output, a DC MIG welding output, and a DC TIG welding output.

* * * * *